United States Patent

Otsuka

[11] Patent Number: 5,991,494
[45] Date of Patent: Nov. 23, 1999

[54] DIGITAL IMAGE DATA PROCESSING APPARATUS AND METHOD

[75] Inventor: Takeshi Otsuka, Kadoma, Japan

[73] Assignee: Matsushita Electric Industrial Co., Ltd., Osaka, Japan

[21] Appl. No.: 09/116,944

[22] Filed: Jul. 17, 1998

Related U.S. Application Data

[62] Division of application No. 08/594,276, Jan. 30, 1996, Pat. No. 5,867,629.

[30] Foreign Application Priority Data

Jan. 30, 1995 [JP] Japan ................................. 7-034564

[51] Int. Cl.[6] ..................................................... H04N 9/79
[52] U.S. Cl. ................................. 386/37; 386/33; 386/40; 386/44
[58] Field of Search ................................. 386/1, 36, 37, 386/44, 13, 27, 31, 32, 33, 34, 40, 131; 348/446, 450; H04N 9/79

[56] References Cited

U.S. PATENT DOCUMENTS

| | | |
|---|---|---|
| 4,862,292 | 8/1989 | Enari et al. . |
| 5,245,427 | 9/1993 | Kunhiro . |
| 5,442,455 | 8/1995 | Hioki et al. ................................. 386/37 |
| 5,574,506 | 11/1996 | Rhodes ..................................... 386/131 |
| 5,848,221 | 12/1998 | Suzuki ....................................... 386/37 |

FOREIGN PATENT DOCUMENTS 2-14468  6/1990  Japan .

OTHER PUBLICATIONS

Recommendation ITU–R.601.
"Draft SMPTE Standard for Television (4:2:2:4 and 2x(4:22)) Bit–serial Digital Interface for Progressive 483 Active Line Scanning Systems", Aug. 23/1, 1994.
"Proposed SMPTE Standard for Television Digital Component Recording–19–mm Type D–1—Helical Data and Control Records, " SMPTE Journal, pp. 203–221, Mar. 1992.
"SMPTE Standard for Television Digital Recording—19mm Type D–2 Composite Format—Helical Data and Control Records," SMPTE Journal, pp. 1165–1174, Dec. 1993.
"Proposed SMPTE Standard for Television Digital Recording –1/2–in Type D–3 Composite Format 525/60," SMPTE Journal, pp. 561–581, Jun. 1993.
An English Language abstract of JP 2–14468.

*Primary Examiner*—Huy Nguyen
*Attorney, Agent, or Firm*—Greenblum & Bernstein, P.L.C.

[57] ABSTRACT

A digital image data processing apparatus has a preprocessing apparatus for preprocessing the digital video data before recording-and a post-processing apparatus for post-processing the digital video data after recording. The preprocessor receives a main channel signal and a sub channel signal, compresses these signals and concatenate into a single channel image data in which the signal position does not change each field for coding by a coder. Image deterioration during reproduction is prevented by a post-processor processing the image data decoded by a decoder by reversing the process applied by the preprocessor.

10 Claims, 15 Drawing Sheets

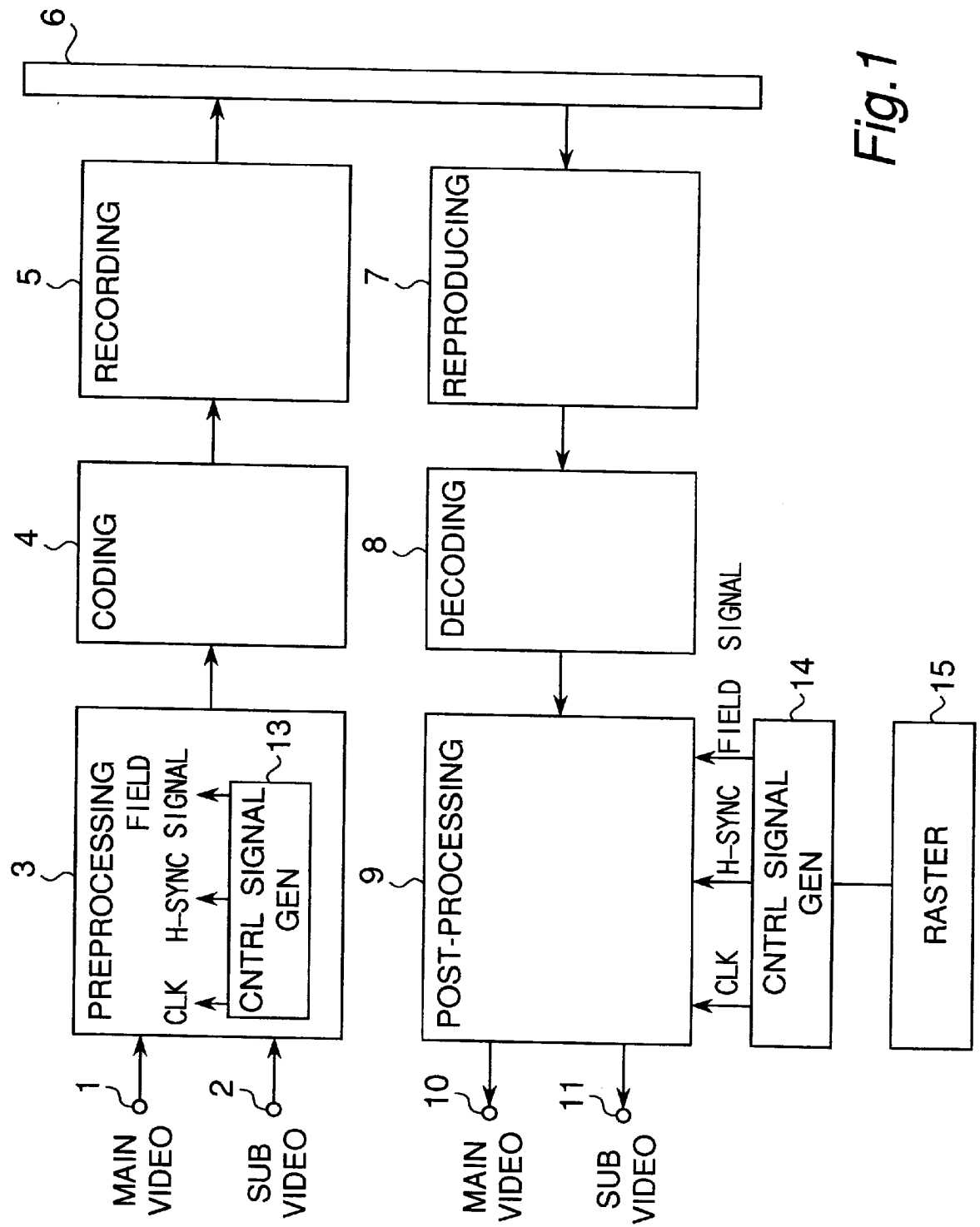

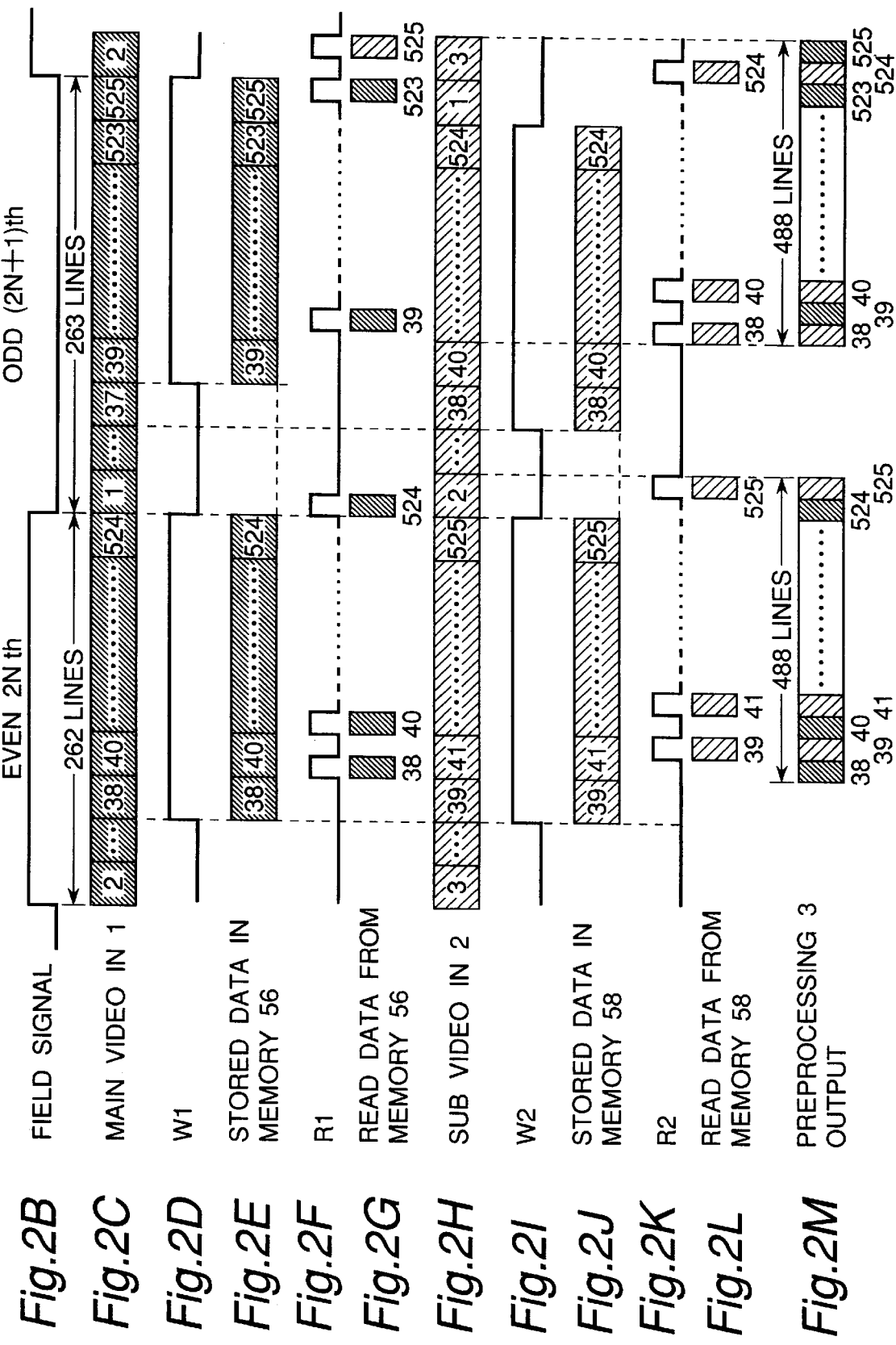

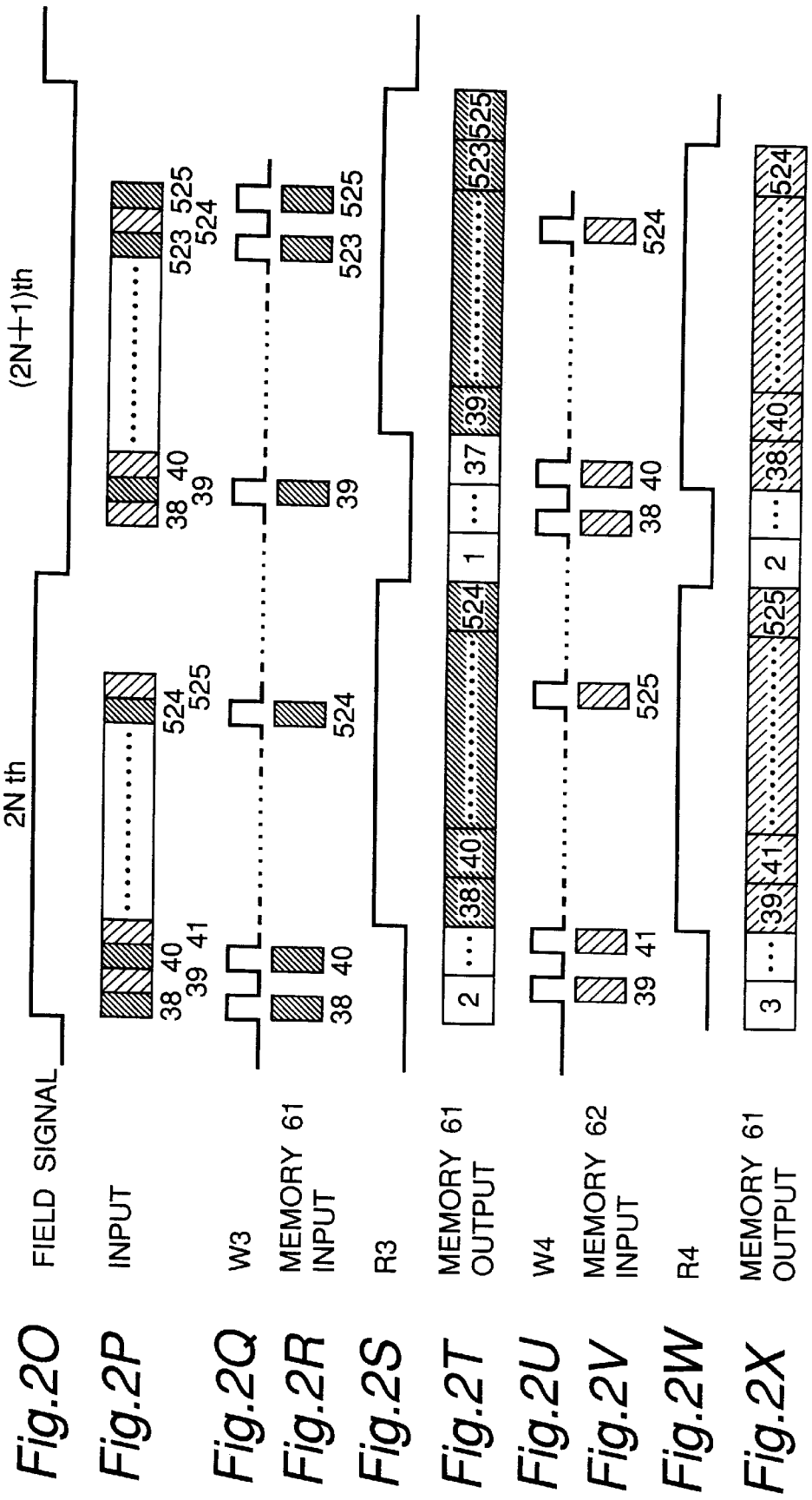

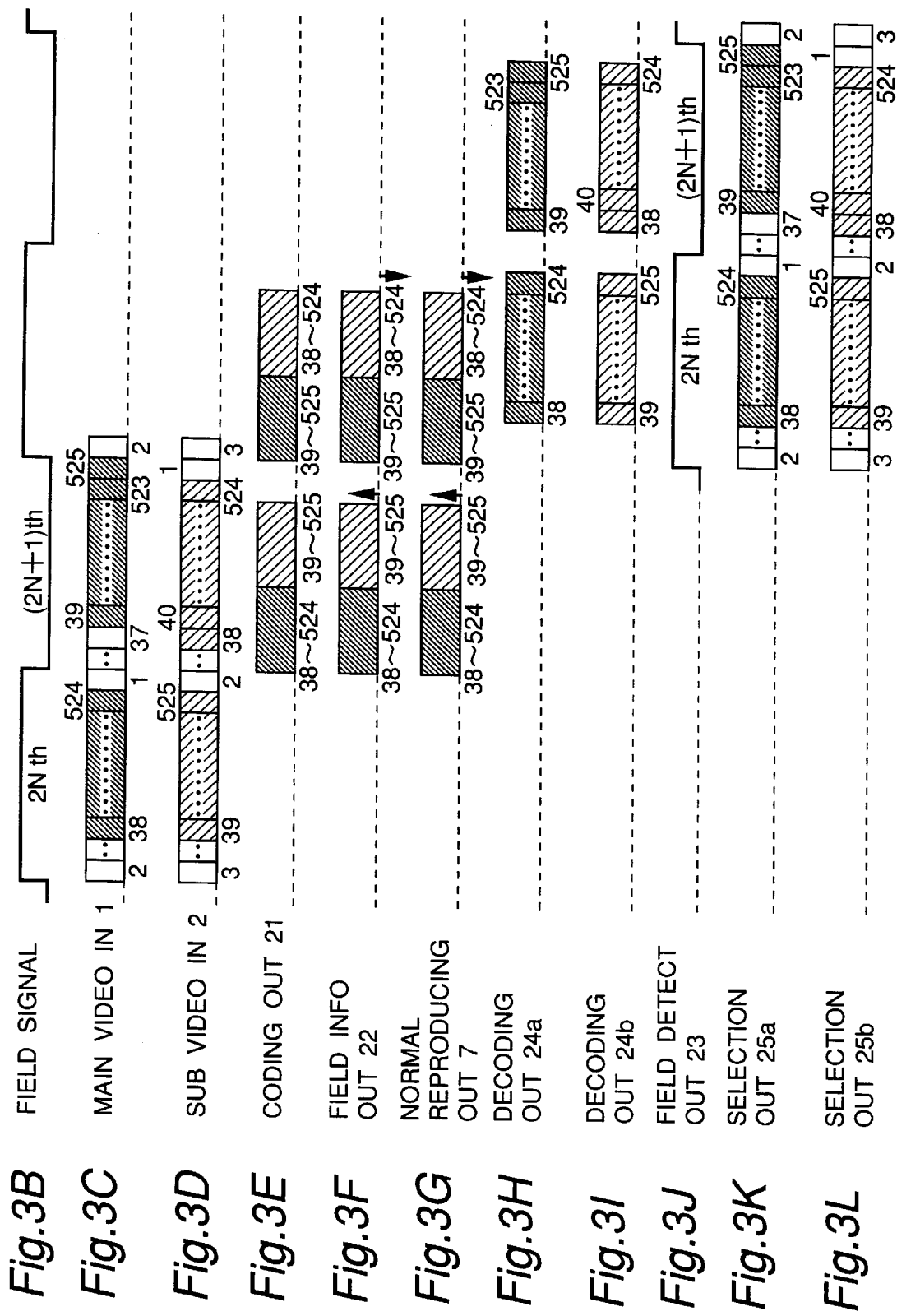

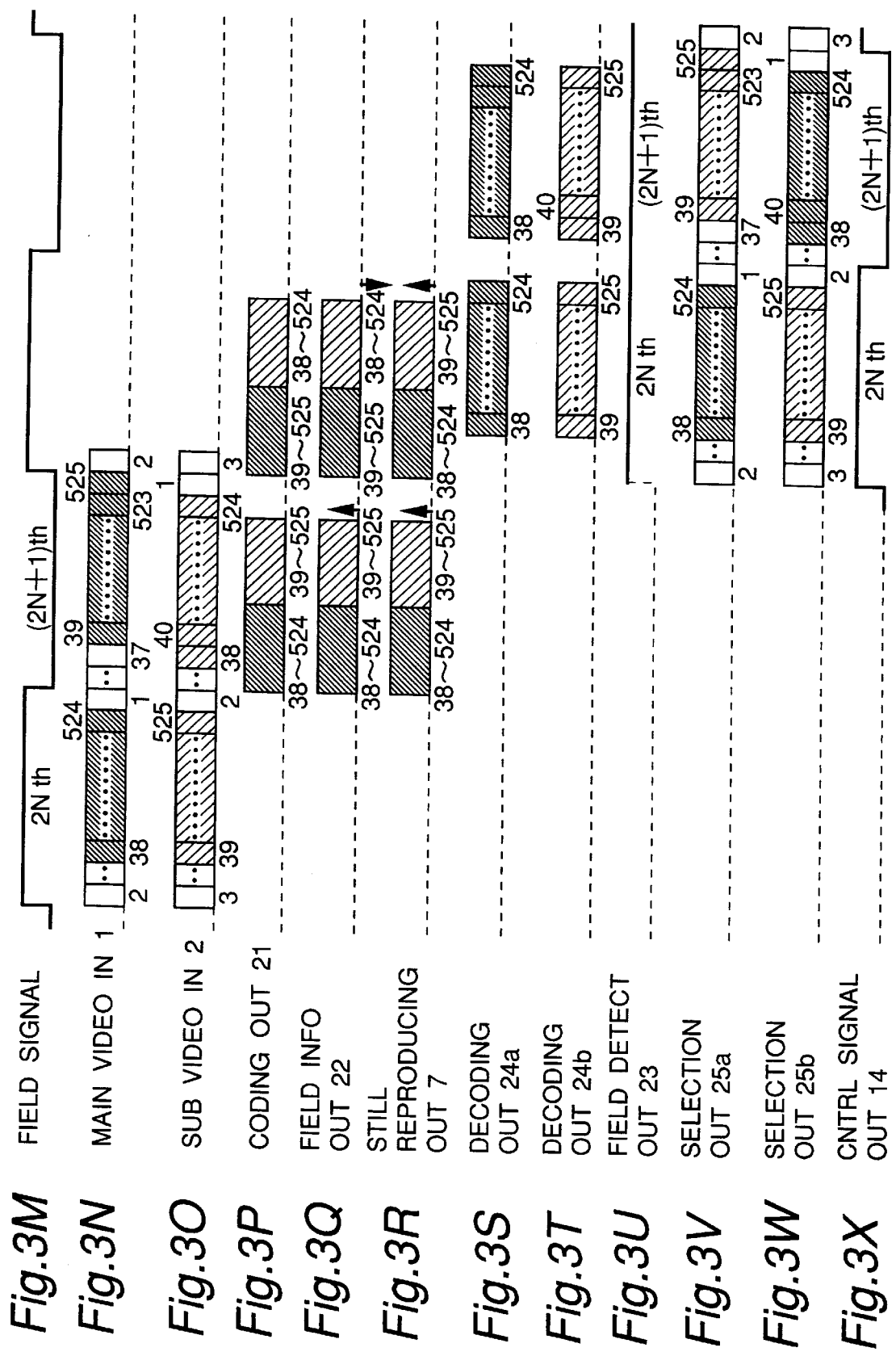

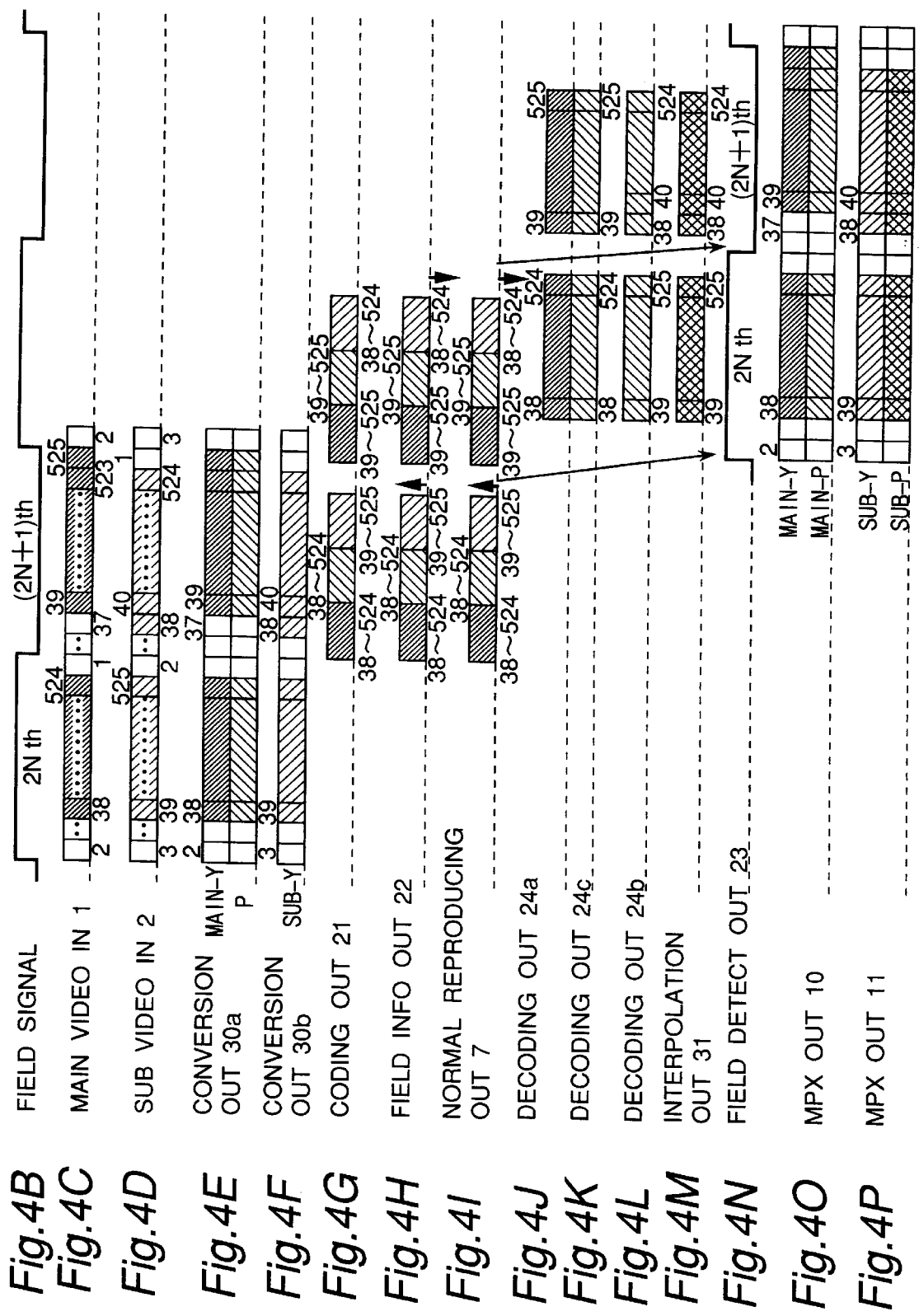

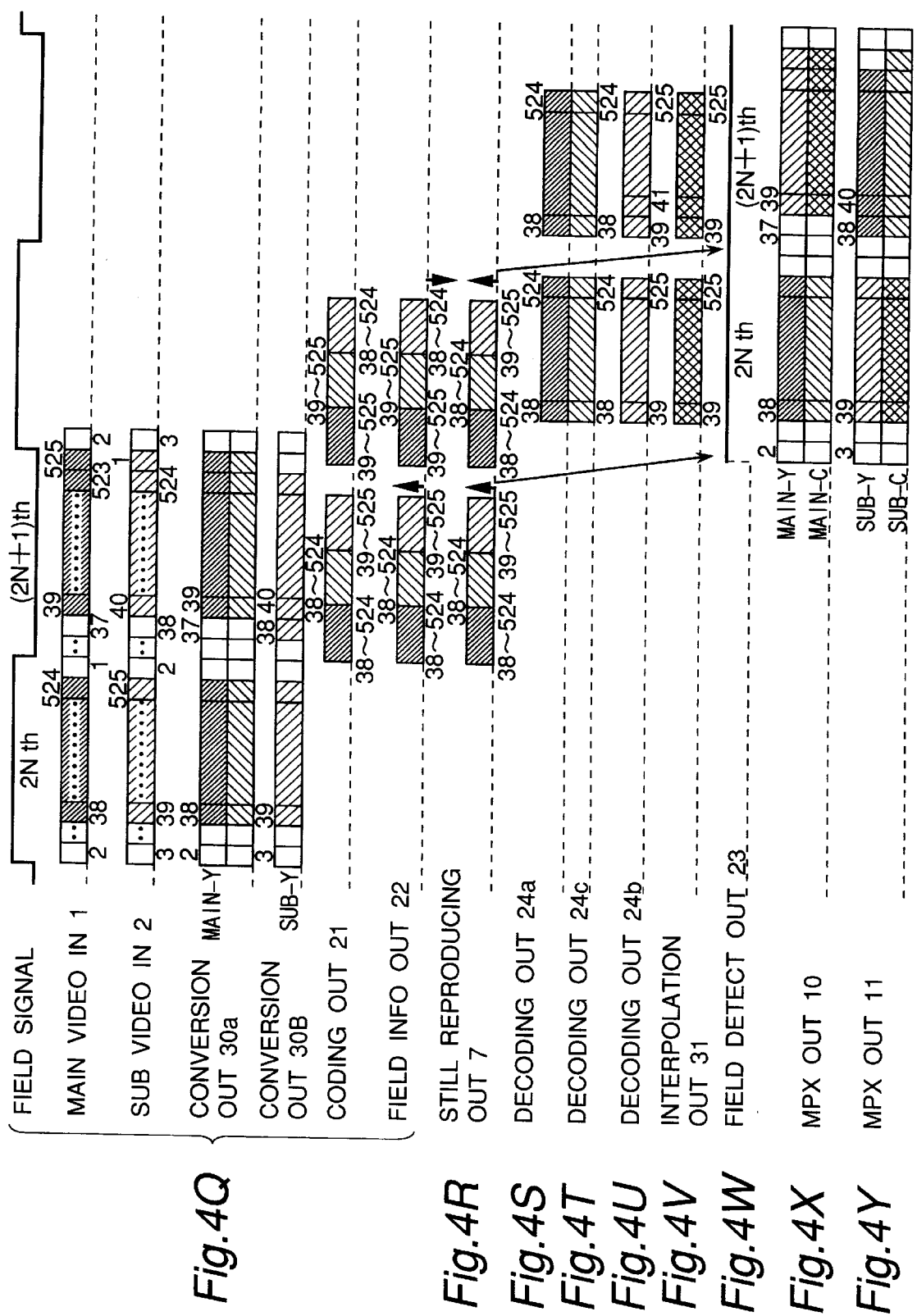

MAIN

SUB

DIGITAL IMAGE DATA PROCESSING APPARATUS AND METHOD

This is a division of application Ser. No. 08/594,276, filed Jan. 30, 1996, now U.S. Pat. No. 5,867,629, the contents of which are herein incorporated by reference in its entirety.

BACKGROUND OF THE INVENTION

1. Field of the Invention

The present invention relates to digital image data processing apparatus and method and, more particularly, to video recording and reproducing apparatus and method for transmitting digital image data by means of progressive component signals.

2. Description of the Prior Art

The D-1 VCR standard for recording a digitally coded video signal by component signals, and the D-2 VCR and D-3 VCR standards for recording composite signals, are currently used for recording and reproducing digital video signals. These standards sample the video signal at a sampling rate sufficiently higher than the video signal band, and quantize the sampled signal at an 8-bit rate for recording to magnetic tape.

Each of these methods, however, records a 4:2:2 signal obtained by sampling the current broadcasting-standard NTSC or PAL signal, or luminance signal (Y) at 13.5 MHz, and the color difference signals (Pb, Pr) at 6.75 MHz.

Two new next-generation broadcasting standards are also being developed, progressive component signal and HD. To handle the data quantity, which is several times that of conventional broadcasting methods, transmitted by these new digital formats, systems are being developed for compressing the video data with high efficiency coding using the correlations between data within the video signal to enable recording by current VCRs. While progressive component signal cameras and monitors have already been developed for use in the progressive component signal method, a compatible VCR has yet to be developed. As a result, two D-1 VCR units, for example, are currently linked and used as a progressive component signal VCR.

A Y, Pb, Pr progressive component video signal with 1525 scanning lines per field (hereinafter "525 p video signal") is an 8:4:4 digitized signal with a sampling frequency twice the sampling frequency of the 4:2:2 member of the family as defined by Recommendation ITU-R.601. The luminance signal sampling frequency in this 8:4:4 signal is therefore 27 MHz, the color difference signal sampling frequency is 13.5 MHz, and the samples are quantized at 10 bits per sample.

Furthermore, according to the Draft SMPTE Standard for Television (4:2:2:4 and 2×(4:2:2) Bit-serial Digital Interface for progressive 483 active line scanning systems; Aug. 23/1, 1994), this main 8:4:4 signal is divided for transmission into two interlaced signals, a main signal consisting of a luminance signal (Y') and two color difference signals (P', P'), and a sub signal consisting of a luminance signal (Y") and two color difference signals (Pd", Pr"), interleaved on a line by line basis. The main and sub signals are each 4:2:2 525-line interlaced signals ("525 i" below) having 525 lines per frame. The signal combining the main and sub signals is referred to as a 4:2:2:4:2:2 signal.

If the 4:2:2:4:2:2 signal is Y':Pb':Pr':Y":Pb":Pr", the pairs Y' and Y", Pb' and Pb", and Pr'and Pr" express the 525 p luminance and color difference signals. When the color difference component Pb" and Pr" sub signals are omitted, the resulting 4:2:2:4 signal is a reduced chrominance bandwidth signal.

The vertical frequency bandwidth of the color difference signals only is limited by a vertical line sampling filter. The 8:4:4 signal in which the vertical frequency band was limited by the vertical line sampling filter is the "8:4v:4v signal." The 4:2:2:4:2:2 signal and 4:2:2:4 signal are generated by dividing the 8:4v:4v signal on a line by line basis. Three types of 1:2:1 line sampling filters, the structure of which is shown in FIG. 5, are currently being studied.

Systems for compressing the 8:4:4 signal for recording to a current 4:2:2 VCR are being considered. Systems for compressing to ⅔ and recording the 4:2:2:4 signal in which the vertical frequency bandwidth of the color difference signals is limited are also being considered.

The digital signal recording apparatus described in Japanese patent Laid-open Publication kokai H2-14468 (1990-14468) converts a double-scan video signal to two interlaced video signals and compresses the interlaced signals ½ for recording to a current 4:2:2 VCR. What it does not describe are specifics about the compression method, or the slow-speed reproduction capabilities of the proposed system.

Furthermore, said proposed digital signal recording apparatus applies signal compression after converting the double-scan, 525 lines/field video signal to two interlaced video signals, resulting in 262 or 263 scanning lines per field in each of the interlaced signals. When one of the two interlaced video signals is the main signal and the other is the sub signal, e.g., if there are 262 scanning lines in the main signal of the odd fields and 263 scanning lines in the sub signal, there will be 263 scanning lines in the main signal of the even fields and 262 scanning lines in the sub signal of the even fields. If the valid 244 lines, for example, of these main and sub signals are separately compressed, the first line of the valid data will be offset 0.5 line between the main and sub signals, and this 0.5 line offset will differ in the even and odd fields. FIGS. 8A and 8B show the structure of the main and sub signals, respectively.

As shown in FIGS. 8A and 8B, when a video signal having 525 scanning lines per field is divided between main and sub signals, the main signal (real lines in FIG. 8A) consists of the even numbered lines (2, 4, ... 524), and the sub signal (real lines in FIG. 8B) consists of the odd numbered lines (1, 3, ... 525), in the odd fields; but, in the even fields, the main signal (dotted lines in FIG. 8A) consists of the odd numbered lines (1, 3, ... 525), and the sub signal (dotted lines in FIG. 8B) consists of the even numbered lines (2, 4, ... 524). As a result, when the interlaced main and sub signals thus divided are compressed and recorded by separately compressing the 244 main signal scanning lines and the 244 sub signal scanning lines from line 20 to line 507, for example, the main signal of field 1 consists of lines 20, 22, ... 506, and the sub signal of field 1 consists of lines 21, 23, ... 507. In field 2, the main signal consists of lines 21, 23, ... 507, and the sub signal consists of lines 20, 22, ... 506. When reproducing a tape thus recorded, the source signal can be reproduced during normal reproduction modes wherein the output field and the field on the tape coincide. During slow-speed reproduction modes in which the output field and the field on tape do not necessarily coincide, however, the output field may be an odd field while the field on tape is an even field, in which case the line numbers of the output main signal are 21, 23, ... 507 while the line numbers of the output sub signal are 20, 22, ... 506. As a result, the odd field progressive component signal combining these main and sub signals will be output in the line sequence 21, 20, 23, 22, ... 507, 506, and the normal progressive component signal cannot be generated.

SUMMARY OF THE INVENTION

Therefore, an object of the present invention is to provide a digital image data processing apparatus for coding with as little image deterioration as possible a progressive component signal consisting of two interlaced signals.

A further object of a digital image data processing apparatus according to the present invention is to decode said coded progressive component signal to a two channel interlaced signal without image deterioration.

A further object of a digital image data processing apparatus according to the present invention is to code with as little image deterioration as possible a progressive component signal consisting of two interlaced signals, and to decode said coded progressive component signal to a two channel interlaced signal without image deterioration.

A further object of a digital image data processing apparatus according to the present invention is to code a progressive component signal consisting of two interlaced signals, and to decode said coded progressive component signal to a two channel interlaced signal without image deterioration.

A further object of a digital image data processing apparatus according to the present invention is to bandwidth limit the color difference signals of the progressive component signal consisting of two interlaced signals and then code the progressive component signal, and to decode said coded progressive component signal to a two channel interlaced signal without image deterioration.

To achieve the aforementioned objects, a digital image data processing apparatus according to the present invention comprises a preprocessing means for processing supplied two channel interlaced digital image data consisting of a main signal and a sub signal obtained by converting sequentially scanned digital image data, and outputting a single channel digital image data stream; and a coding means for coding the digital image data output by the preprocessing means. The preprocessing means switches the first digital image data to be processed between the main and sub signal components of the two channel signal of interlaced main and sub signals to generate and output a single channel digital image data stream containing both main and sub signals.

A digital image data processing apparatus according to the present invention may comprise a decoding means for decoding the coded digital image data; a post-processing means applying to the digital image data decoded by the decoding means a process that reverses the process applied by the preprocessing means; and a post-processing means for converting the decoded digital image data for output as a two channel interlaced image data signal consisting of main and sub signal components. At each output field, the first data in the decoded digital image data is assigned to either the main signal or the sub signal to generate the two channel interlaced image data signal consisting of main and sub signal components.

A digital image data processing apparatus according to a further embodiment of the invention comprises a preprocessing means for processing supplied two channel interlaced digital image data consisting of a main signal and a sub signal obtained by converting sequentially scanned digital image data, and outputting a single channel digital image data stream; a coding means for coding the digital image data output by the preprocessing means; a decoding means for decoding the coded digital image data; and a post-processing means applying to the digital image data decoded by the decoding means a process that reverses the process applied by the preprocessing means. The preprocessing means switches the first digital image data to be processed between the main and sub signal components of the two channel signal interlacing the main signal and sub signal to generate and output a single channel digital image data stream containing both main and sub signals. The post-processing means assigns the first data in the decoded digital image data to either the main signal or the sub signal at each output field to generate a two channel interlaced image data signal consisting of main and sub signal components.

A digital image data processing apparatus according to a further embodiment of the invention comprises a post-processing means for converting decoded digital image data to output two channel interlaced image data consisting of main and sub signal components; a coding means for coding the supplied two channel interlaced image data consisting of main and sub signal components; a field information transmission means for outputting as the digital image data the digital image data coded by the coding means and the field information of the supplied two channel interlaced signals; a decoding means for decoding the digital image data output from the field information transmission means to obtain the main and sub signals; a field detection means to which the digital image data output from the field information transmission means is input for detecting the field of the digital image data to be decoded; and a selection means for outputting the main and sub signal components of the output from the decoding means when the field detected by the field detection means and the output field match, and interchanging and outputting the main and sub signal components of the output from the decoding means when the field detected by the field detection means and the output field do not match.

A digital image data processing apparatus according to the present invention may further comprise an input terminal for two channel digital image data consisting of interlaced main and sub signal components generated by converting sequentially scanned digital image data; a data conversion means for processing the color difference signals of the digital image data consisting of two interlaced main and sub signal channels input from the input terminal by applying the process of a vertical sampling filter to the color difference signal of the main signal component and the color difference signal of the sub signal component, and inserting the vertically filtered color difference signal to only the digital image data of the interlaced main signal; a coding means for coding the digital image data output from the data conversion means; a field information transmission means for outputting as the digital image data the digital image data coded by the coding means and the supplied field information of the two interlaced signal channels; a decoding means for decoding coded digital image data to obtain the main signal component consisting of a luminance signal and color difference signals, and the sub signal component consisting of only a luminance signal; a field detection means to which the digital image data output from the field information transmission means is input for detecting the field of the digital image data to be decoded; an interpolation means for applying the process of a vertical interpolation filter to the digital image data of the color difference signal restored to the interlaced main signal by the decoding means, and restoring the color difference signal of the interlaced sub signal; and a color difference signal selection means to which are input the color difference signal of the main signal in the output of the decoding means, the color difference signal of the sub signal interpolated by the interpolation means, the field of the output digital image data, and the field, detected by the field detection means, of the digital image data to be decoded, and which directly outputs the color difference signal of the main signal and the interpolated color difference signal of the sub signal when the field of the output digital image data matches the field of the decoded digital image data, and interchanges and then outputs the color difference signal of the main signal and the interpolated color difference signal of the sub signal when said fields do not match.

By the configurations thus described, a digital image data processing apparatus according to the present invention switches the first digital image data to be processed by the preprocessing means on a field unit basis between the main and sub signal components of two channel interlaced digital image data consisting of main and sub signal components input from an input terminal, and the coding means codes the main and sub signal components to a single channel digital image data stream.

The coded digital image data is then decoded by the decoding means, the digital image data decoded by the decoding means is input to a post-processing means, and the post-processing means assigns the first data in the decoded digital image data to the main signal component or the sub signal component to output a two channel interlaced image data stream consisting of main and sub signal components.

Alternatively, a coding means codes two channel interlaced digital image data consisting of main and sub signal components input from an input terminal; a field information transmission means outputs the coded digital image data and the field information of the supplied two channel interlaced signal as the digital image data; a decoding means decodes the digital image data output from the field information transmission means to restore the main and sub signals; a field detection means detects the fields of the digital image data to be decoded; and a selection means outputs the main and sub signal components of the output from the decoding means when the field detected by the field detection means and the output field match, and interchanges and outputs the main and sub signal components of the output from the decoding means when the field detected by the field detection means and the output field do not match.

Alternatively, the data conversion means applies the process of a vertical sampling filter to the color difference signal of the main signal component and the color difference signal of the sub signal component of digital image data consisting of two interlaced main and sub signal channels input from the input terminal, and inserts the vertically filtered color difference signal to only the digital image data of the interlaced main signal. The coding means codes the digital image data output from the data conversion means The field information transmission means combines the digital image data coded by the coding means and the field information of the supplied two interlaced signal channels. The decoding means decodes the digital image data output from the field is information transmission means to obtain the main signal component consisting of a luminance signal and color difference signals, and the sub signal component consisting of only a luminance signal. The field detection means detects the fields of the digital image data to be decoded. The interpolation means applies the process of a vertical interpolation filter to the digital image data of the color difference signal restored to the interlaced main signal by the decoding means, and restores the color difference signal of the interlaced sub signal. The color difference signal selection means, to which are input the color difference signal of the main signal in the output of the decoding means, the color difference signal of the sub signal interpolated by the interpolation means, the field of the output digital image data, and the field, detected by the field detection means, of the digital image data to be decoded, then directly outputs the color difference signal of the main signal and the interpolated color difference signal of the sub signal when the field of the output digital image data matches the field of the decoded digital image data, and interchanges and then outputs the color difference signal of the main signal and the interpolated color difference signal of the sub signal when said fields do not match.

BRIEF DESCRIPTION OF THE DRAWINGS

The present invention will become more fully understood from the detailed description given below and the accompanying diagrams wherein:

FIG. 1 is a block diagram of a digital image data processing apparatus according to the first embodiment of the present invention;

FIGS. 2B, 2C, 2D, 2E, 2F, 2G, 2H, 2I, 2J, 2K, 2L and 2M are graphs showing signals produced in the block diagram of FIG. 2A;

FIGS. 2O, 2P, 2Q, 2R, 2S, 2T, 2U, 2V, 2W and 2X are graphs showing signals produced in the block diagram of FIG. 2N;

FIGS. 3B, 3C, 3D, 3E, 3F, 3G, 3H, 3I, 3J, 3K and 3L are graphs showing signals produced in the block diagram of FIG. 3A under normal reproducing mode;

FIGS. 3M, 3N, 3O, 3P, 3Q, 3R, 3S, 3T, 3U, 3V, 3W and 3X are graphs showing signals produced in the block diagram of FIG. 3A under still picture reproducing mode;

FIGS. 4B, 4C, 4D, 4E, 4F, 4G, 4H, 4I, 4J, 4K, 4L, 4M, 4N, 4O and 4P are graphs showing signals produced in the block diagram of FIG. 4A under normal reproducing mode;

FIGS. 4Q, 4R, 4S, 4T, 4U, 4V, 4W, 4X and 4Y are graphs showing signals produced in the block diagram of FIG. 4A under still picture reproducing mode;

DESCRIPTION OF PREFERRED EMBODIMENTS

Figure 2A:
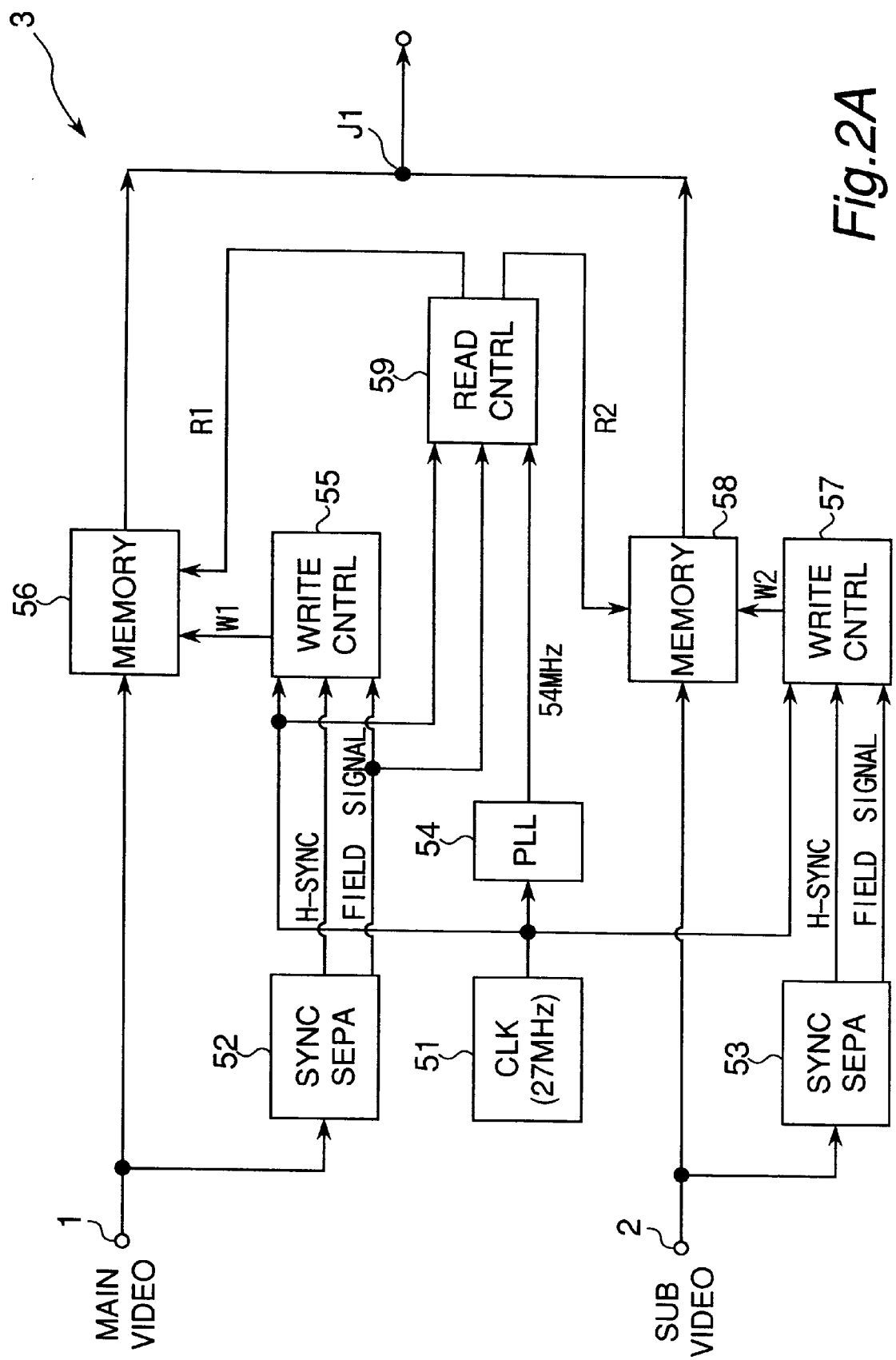
FIG. 2A is a block diagram of a preprocessing block shown in FIG. 1.

The first embodiment of the present invention is described below with reference to the accompanying figures. FIG. 1 is a block diagram of a processing apparatus for 4:2:2:4:2:2 digital image data according to the first embodiment of the invention.

Referring to FIG. 1, the main signal of 4:2:2 interlaced digital image data is input to the main signal input terminal 1, and the sub signal of 4:2:2 interlaced digital image data is input to the sub signal input terminal 2. The preprocessing block 3 switches the first digital image data to be processed on a field unit basis between the main and sub signal components of the two channel signal of interlaced main and sub signals input from input terminals 1 and 2 to output the main and sub signals as a single channel digital image data stream (FIG. 2M). The coding block 4 codes the digital image data output from the preprocessing block 3. The recording block 5 executes the modulation or other processing required to record the digital image data coded by the coding block 4 to a recording medium, such as a magnetic tape 6 or a disk.

The reproduction block 7 reproduces the digital image data recorded to the magnetic tape 6. The decoding block 8 decodes the coded digital image data. The post-processing block 9 assigns the first data in the decoded digital image data to either the main signal or the sub signal at each output field to generate a two channel interlaced image data signal consisting of interlaced main and sub signal components, and outputs said two channel interlaced signal from main signal output terminal 10 or sub signal output terminal 11.

The main signal of the digital image data input from the main signal input terminal 1, and the sub signal of the is digital image data input from the sub signal input terminal 2, are input to the preprocessing block 3, which combines the digital image data transmitted by interlaced main and sub signal components on two separate channels to a single channel.

Referring to FIG. 2A, a detail of the preprocessing block 3 is shown. The preprocessing block 3 comprises a clock generator 51 for generating clock pulses having a frequency 27 MHz and a phase locked loop 54 which doubles the frequency of the clock pulse to 54 MHz. Connected to the input terminal 1 is a sync separator 52 for separating H-sync pulses and field signal from the main video signal supplied to terminal 1. As shown in FIG. 2B, the field signal is a 50% duty ratio signal altered in accordance with the odd ((2N+1) th, N being an integer) field and even ((2N)th) field. In FIG. 2B, the HIGH level period is indicated as the even ((2N) th) field and the LOW level period is indicated as the odd ((2N+1) th field, but can be opposite. Also connected to the input terminal 1 is a memory 56 for storing one field data. Writing and reading of memory 56 are controlled by write control 55 and read control 59, respectively. Wright control 55 receives 27 MHz clock, H-sync and field signal, and produces a write signal W1 (FIG. 2D) which is a pulse covering only an effective image data area in each field. Read control 59 receives 54 MHz clock, H-sync and field signal, and produces read signals R1 and R2. Read signal R1 is a pulse produced at every line and having a pulse width covering the first half of each line period. Similarly, read signal R2 is a pulse produced at every line and having a pulse width covering the second half of each line period.

As apparent from the above, the read signals R1 and R2 are produced alternately, but according to the present invention, read control 59 is so arranged that by the use of the field signal (FIG. 2B) from sync separator 52, read signal R1 is before R2 produced in the 2Nth field, and read signal R2 is produced before R1 in the (2N+1)th field.

Further provided in the preprocessing block 3 are sync separator 53 and memory 58 both connected to the input terminal 2, and a write control 57 for producing a write signal W2 (FIG. 2I) using 27 MHz clock from clock generator 51, and H-sync and field signal from sync separator 53. It is noted that the sync separators 52 and 53 are shown as control signal generator 13 in FIG. 1.

Note that the numbers shown in FIGS. 2B–2M are the scanning line numbers, and the present embodiment applies coding on a frame basis where each frame consists of lines 38 to 525. The interlaced signal furthermore consists of 525 lines in this example. As a result, if the first field (field 1) contains 262 lines and the second field (field 2) contains 263 lines, the main signal of field 1 contains the even-numbered lines and the sub signal contains the odd-numbered lines, while the main signal of field 2 contains the odd-numbered lines, and the sub signal contains the even-numbered lines. Both fields 1 and 2 are recorded from line 38. Thus, the first data per field unit of the digital image data processed by this embodiment is the digital image data of the main signal in field 1, and the digital image data of the sub signal in field 2.

In operation, the terminal 1 for the main video signal (FIG. 2C) receives every other line signals, such as even line signals, and the terminal 2 for the sub video signal (FIG. 2H) receives the remaining every other line signals, such as odd line signals; odd and even relationship is changed after every field. It is assumed that during 2Nth field, the main video signal applied to terminal 1 includes even number lines 2, 4, 6, . . . , 524, and the sub video signal applied to terminal 2 includes odd number lines 3, 5, 7, . . . , 525. By interlacing these two even and odd number lines starting from, for example, even number line "38", one complete frame signal, i.e., a single channel digital image data stream (FIG. 2M), will be produced. Then, during the next (2N+1)th field, terminal 1 receives odd number lines 1, 3, 5, . . . , 525, and the terminal 2 receives even number lines 2, 4, .6, . . . , 524. Similarly, by interlacing these two even and odd number lines starting from the same number line as before, i.e., even number line "38", one complete frame signal, i.e., a single channel digital image data stream (FIG. 2M), will be produced.

During one pulse period of write signal W1, one effective image data area (even lines 38 to 524) in one field of the main video signal (FIG. 2E) is stored in memory 56 using 27 MHz pulses, and at the same period of time, i.e., during one pulse period of write signal W2, one effective image data area (odd lines 39 to 525) in one field of the sub video signal (FIG. 2J) is stored in memory 58 using 27 MHz pulses.

During one pulse period of read signal R1, such as the first one shown in FIG. 2F, the first line data (line 38) stored in memory 56 is read using 54 MHz pulses. Note that the reading speed is twice as fast as the writing speed. Since one line data is held in the memory 56 and is released in the next line period, memory 56 has a size enough to hold one line data. The same can be said to memory 58.

Similarly, during one pulse period of read signal R2, such as the first one shown in FIG. 2K, the first line data (line 39) stored in memory 58 is read using 54 MHz pulses. Then, the read line data are interlaced at junction J1 to produce one frame video data in proper line sequence.

It is noted that read control 59 is so arranged that the pulses of the read signals R1 and R2 occur in the first half of the line period for the even lines, and in the second half for the odd lines. In another way of expressing, read control 59 is so arranged that the pulses of the read signal R1 occur in the first half of the line period during 2Nth field signal period, and in the second half of the line period during (2N+1) th field signal period, and that the pulses of the read signal R2 occur in the second half of the line period during 2Nth field signal period, and in-the first half of the line period during (2N+1)th field signal period.

The digital image data processed by the preprocessing block 3 is then input to the coding block 4, and compressed thereby to ½ by a high efficiency coding algorithm. The digital image data compressed by the coding block 4 is then supplied to the recording block 5 for modulation or other processing, and then recorded to the magnetic tape 6.

By thus providing a preprocessing block, the main and sub signals are coded together. The high correlation between main and sub signal components that is characteristic of a progressive component signal can thus be utilized to code the main and sub signal components with greater efficiency than is possible when coding the main and sub signals separately.

When the signal thus recorded to the magnetic tape 6 is reproduced, the digital image data reproduced from the magnetic tape 6 by the reproduction block 7 is supplied to the decoding block 8, which decodes and restores the compressed digital image data to the source signals.

A detail of the coding block 4 and decoding block 8 is disclosed in U.S. Pat. No. 5,245,427 to Kunihiro, which is herein incorporated by reference. Also, a detail of the recording and reproducing blocks 5 and 7 is disclosed in SMPTE Journal, March 1992 pp 203–221 "PROPOSED SMPTE STANDARD for Television Digital Recording 19-mm Type D-1 Composite Format Helical Data and Control Records", SMPTE Journal, December 1993 pp 1165–1174 "SMPTE STANDARD for Television Digital Recording 19-mm Type D-2 Composite Format Helical Data and Control Records", and SMPTE Journal, June 1993 pp 561–581 "PROPOSED SMPTE STANDARD for Television Digital Recording ½-in Type D-3 Composite Format 525/60, which are herein incorporated by reference.

Figure 2N:
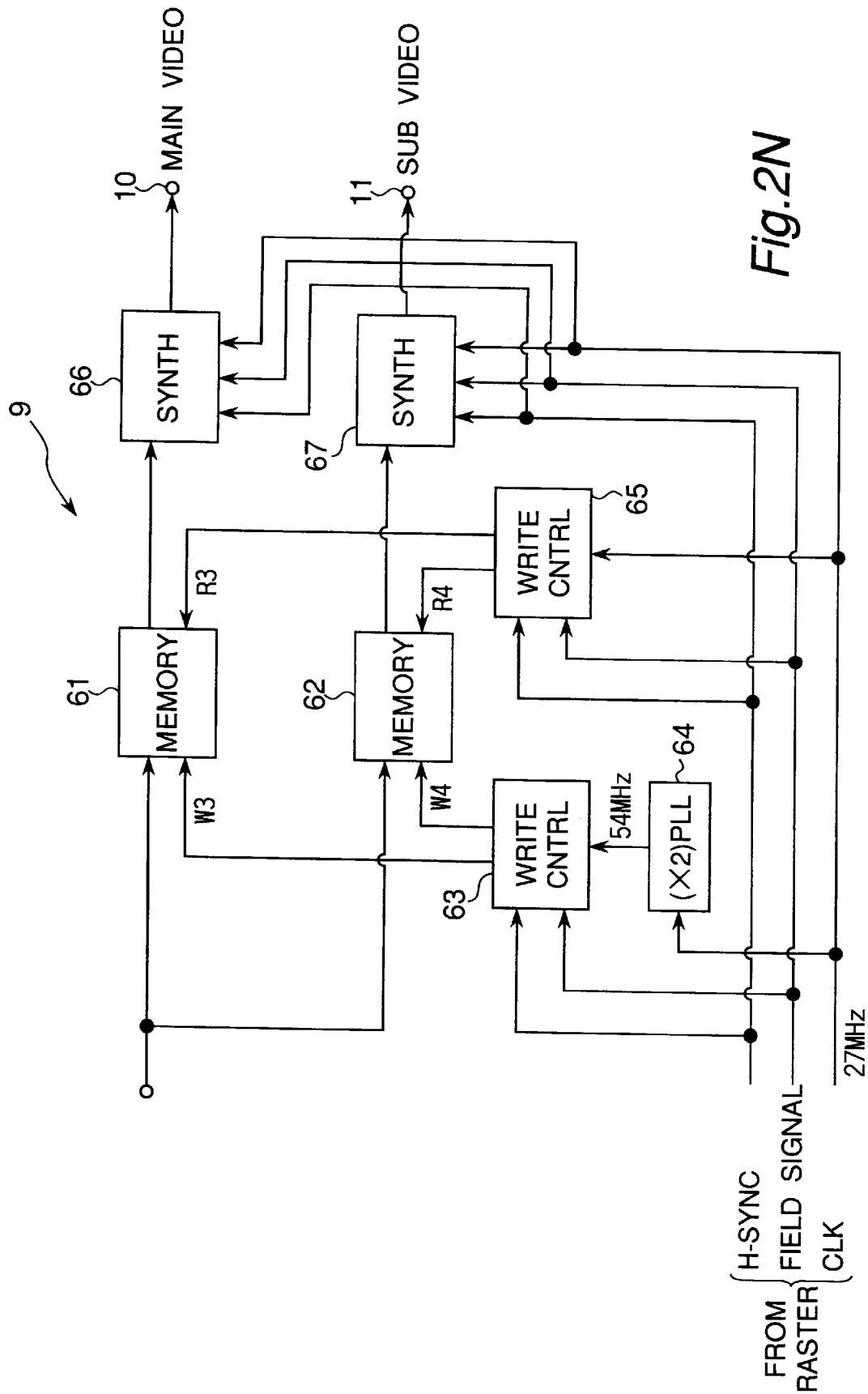
FIG. 2N is a block diagram of a post-processing block shown in FIG. 1.

Referring to FIG. 2N, a detail of the post-processing block 9 is shown. The post-processing block 9 comprises memories 61 and 62, write control 63, phase locked loop 64, read control 65, synthesizers 66 and 67. Furthermore, as shown in FIG. 1, the post-processing block 9 is coupled with a control signal generator 14 which is in turn coupled with a raster 15 of a monitor (not shown). The control signal generator 14 produces 27 MHz clock, H-sync pulse and field signal in compliance with the operation of the raster 15 of the reproducing monitor.

In operation, the input of the post-processing block 9 receives one frame signal (FIG. 2P) defined by consecutive lines 38 to 525 in response to the field signal (FIG. 2O), and the write signal W3 (FIG. 2Q) and write signal W4 (FIG. 2U) are produced alternately. Write signal W3 is produced first when the field signal is in 2Nth period; and write signal W4 is produced first when the field signal is in (2N+1) th period. During the write signals W3 and W4 are present, video signals are written to memories 61 and. 62 (FIGS. 2R and 2V), respectively, using 54 MHz clock. Then, after a predetermined delay time, such as two line periods, read signals R3 and R4 (FIGS. 2S and 2W) are applied to memories 61 and 62, respectively, to read the video signals (FIGS. 2T and 2X) using 27 MHz clock. During the 2Nth field signal period, the video signal read from memory 61 contains only the even number lines, and the video signal read from memory 62 contains only the odd number lines. Then, during the (2N+1) th field signal period, the video signal read from memory 61 contains only the odd number lines, and the video signal read from memory 62 contains only the even number lines.

The video signals read from memories 61 and 62 are applied to synthesizers 66 and 67, respectively, for adding V-sync pulses and line data from line 1 to line 37 to main and sub signals.

The above operation was for the normal reproducing mode. Under a still picture reproducing mode, decoding block 8 repeatedly produces the data in one field signal period, such as in the 2Nth field signal period or in the (2N+1)th field signal period. It is assumed that the data in the 2Nth field signal period shown in FIG. 20 is used for reproducing a still picture. In this case, the field signal repeatedly produces a HIGH level signal. Thus, the alternating write signals W3 and W4 are produced in such an order that the write signal W3 is produced first, and then the write signal W4.

As apparent from the above, the post-processing block 9 applies a process that is essentially the opposite as that applied by the preprocessing block 3, and the signals are mapped back to the main and sub signals according to a reference output field.

While the two channel interlaced signals input in this embodiment are differently formatted in fields 1 and 2, fields 1 and 2 are coded by the preprocessing block 3 using the same format as shown in FIG. 2M. As a result, the same signal processing can be applied even if the digital image data reproduced in a slow speed reproduction mode is reproduced continuously from the same field, and a slow-mode reproduction image with no image deterioration can be achieved.

The coding efficiency of a two channel interlaced signal in the 4:2:2:4:2:2 format generated by converting an 8:4:4 progressive component signal can also be increased by the digital image data processing apparatus of this embodiment. In addition, because the digital image data to be coded is co-sited in fields 1 and 2, the same signal processing can be used even if the field of the coded digital image data and the field of the output digital image data differ, and deterioration-free, vertical jitter-free digital image data can be obtained.

Figure 3A:
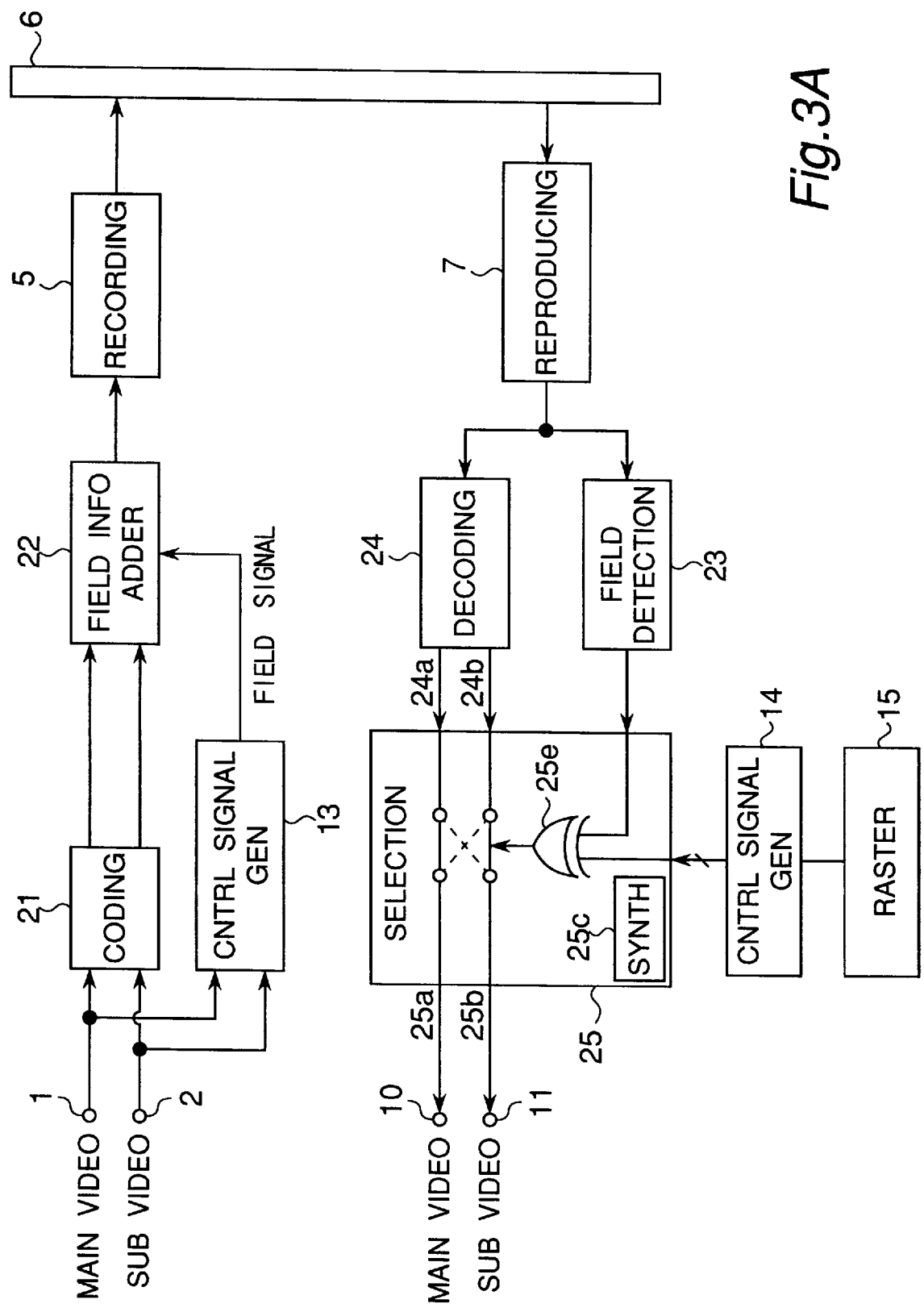
FIG. 3A is a block diagram of a digital image data processing apparatus according to the second embodiment of the present invention.

FIG. 3A is a block diagram of a processing apparatus for 4:2:2:4:2:2 digital image data according to the second embodiment of the invention. Like parts in this embodiment and the first embodiment shown in FIG. 1 are identified by like reference numbers, and further description thereof is omitted below.

Referring to FIG. 3A, a coding block 21 codes the main and sub signals (two channel signals) input from the input terminals 1 and 2 according to the known method so that the video signal input to terminals 1 and 2 are each compressed to ½ by a high efficiency coding algorithm and are concatenated as shown in FIG. 3E into a single channel digital image data stream. More specifically, the two channel, main and sub signals in the 2Nth field are compressed and concatenated into a single channel signal and produced from the coding block 21 during the (2N+1)th field.

A field information adding block 22 multiplexes or adds a field information indicative of either odd field or even field to the compressed and concatenated signal output by the coding block 21, and transmits the multiplexed signal to the recording block 5. As shown in FIG. 3F, the field information shown by an upward arrow at the end of the compressed and concatenated signal indicates an even field 2Nth, and the field information shown by a downward arrow at the end of the compressed and concatenated signal indicates an odd field (2N+1)th. The signal as shown in FIG. 3F is recorded on a tape 6 by the recording block 5.

As shown in FIG. 3A, the compressed and concatenated signal recorded to the magnetic tape 6 is reproduced by the reproduction block 7 and applied to both a field detection block 23 and a decoding block 24. The field detection block 23 detects the field information, which is either even field or odd field, from the compressed and concatenated digital image data reproduced by the reproduction block 7, and produces, as shown in FIG. 3J, a HIGH level signal when the detected field information is an even field 2Nth, and a LOW level signal when it is an odd field (2N+1) th. The decoding block 24 decodes the compressed and concatenated digital image data output by the reproduction block 7 to restore the main and sub signals according to a known manner. In other words, the decoding block 24 does the opposite of coding block 21. Thus, for the 2Nth field, the decoding block 24 expands and separates the even number lines to produce from its output 24a main channel data of even lines 38–524, and expands and separates the odd number lines to produce from its output 24b sub channel data of odd lines 39–525, as shown in FIGS. 3H and 3I. The coding block 21 and the decoding block 24 are disclosed, such as in U.S. Pat. No. 5,245,427 to Kunihiro, which is herein incorporated herein by reference.

A selection block 25 receives a first field information from field detector 23 and a second field information from control signal generator 14. The control signal generator 14 produces 27 MHz clock, H-sync pulse and field signal in compliance with the operation of the raster 15 of the reproducing monitor. The selection block 25 also receives the main and sub channel data from outputs 24a and 24b of decoding block 24. In the selection block 25, the first and second field information are taken into an EXCLUSIVE-OR 25e and the result is used for switching the main and sub channel lines. When the first and second field information match, the EXCLUSIVE-OR 25e produces a HIGH level to maintain the connection between (24a, 24b) and (25a, 25b) as shown by real lines, and when the first and second field information are unmatched, the EXCLUSIVE-OR 25e produces a LOW level to switch the connection between (24a, 24b) and (25a, 25b) as shown by dotted lines.

The selection block 25 further has synthesizers, generally shown by 25c, for adding V-sync pulses and line data from line 1 to line 37 to each of the main and sub signals.

In operation, under the normal reproducing mode, the compressed and concatenated digital image data output by the reproduction block 7 continuously advances so that signals of 2Nth, (2N+1)th, et seq. are reproduced (FIG. 3G). Thus, the output 24a of decoder 24 produces the main video signal sequentially (FIG. 3H), and the output 24b produces the sub video signal sequentially (FIG. 3I). Also, the field detector 23 produces the first field information which is 50% duty ratio pulses, taking a HIGH level signal during 2Nth field period and a LOW level signal during (2N+1)th field period (FIG. 3J). Since the second field information is the same as the first field information, the EXCLUSIVE-OR 25e continuously produces a HIGH level signal to maintain the real line connection between (24a, 24b) and (25a, 25b). Thus, the main and sub video signals as produced from decoder 24 are outputted from main and sub video output terminals 10 and 11 without any exchange (FIGS. 3K and 3L).

The operation under the still picture reproduction mode is described next with reference to FIGS. 3M–3W, in which FIGS. 3M–3Q are the same as FIGS. 3B–3F. Under the still picture reproducing mode, one field data of the compressed and concatenated digital image data output by the reproduction block 7 is repeatedly reproduced; for example, signal of 2Nth field is repeatedly reproduced (FIG. 3R). This can be done by stopping the tape 6 and running the reproducing head over the same track repeatedly, or by providing a memory in decoder 24 to reproduce the same field data repeatedly. Thus, the output 24a of decoder 24 produces the same main video signal repeatedly (FIG. 3S), and the output 24b produces the same sub video signal repeatedly (FIG. 3T). Also, the field detector 23 produces the first field information which is maintained either HIGH or LOW level. In the above exemplification, even field is repeated so that the HIGH level signal is produced continuously (FIG. 3U) as the first field information. The second field information is 50% duty ratio pulses, taking a HIGH level signal during 2Nth field period and a LOW level signal during (2N+1)th field period (FIG. 3X). The second field information is the same as the first field information during 2Nth field periods, but the first and second field information differ during (2N+1)th field periods. Thus, the EXCLUSIVE-OR 25e produces a HIGH level signal during the 2Nth field periods in which the real line connection is made in selection 25, and a LOW level signal during the (2N+1)th field periods in which the dotted line connection is made. Thus, the main and sub video signals as produced from decoder 24 are exchanged after every other field (FIGS. 3V and 3W). This prevents vertical jitter, i.e., the appearance of the image wiggling vertically during the still picture reproduction mode. A similar operation is done during a fast reproduction mode or during a slow reproduction mode.

Because an 8:4:4 progressive component signal is converted to generate a two (main and sub) channel digital image data stream in a 4:2:2:4:2:2 format of which the main and sub channels are separately coded, and the field information during coding is multiplexed to the coded digital image data by the field information adding block, it is possible during decoding to detect the multiplexed field information, and interchange the main and sub signals when the output field and the decoded digital image data field do not match. As a result, deterioration- and vertical jitter-free digital image data can be-obtained.

Figure 4A:
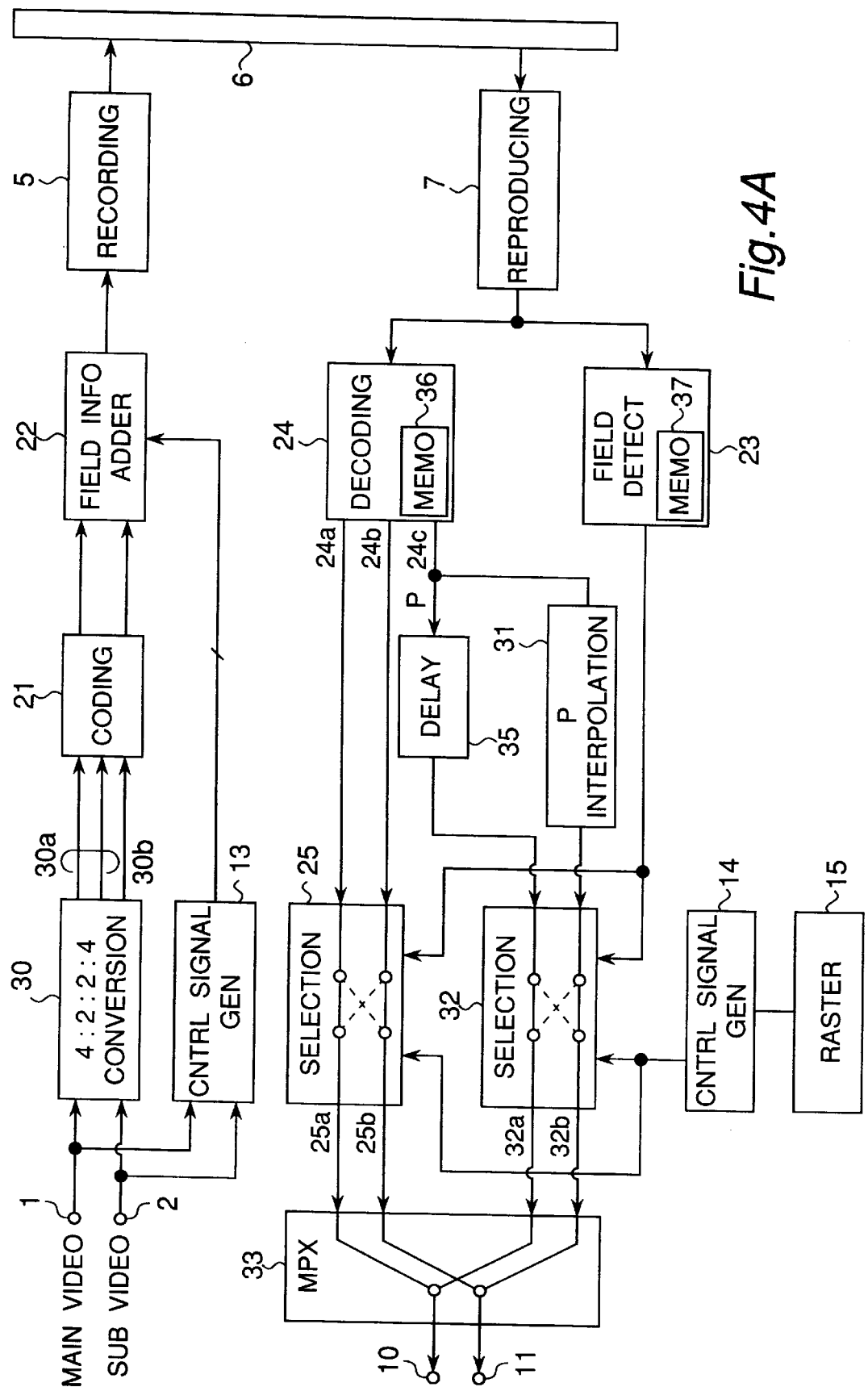
FIG. 4A is a block diagram of a digital image data processing apparatus according to the third embodiment of the present invention.

FIG. 4A is a block diagram of a processing apparatus for 4:2:2:4 digital image data according to the third embodiment of the invention. Like parts in this embodiment and the first and second embodiments above are identified by like reference numbers, and further description thereof is omitted below.

Figure 5:
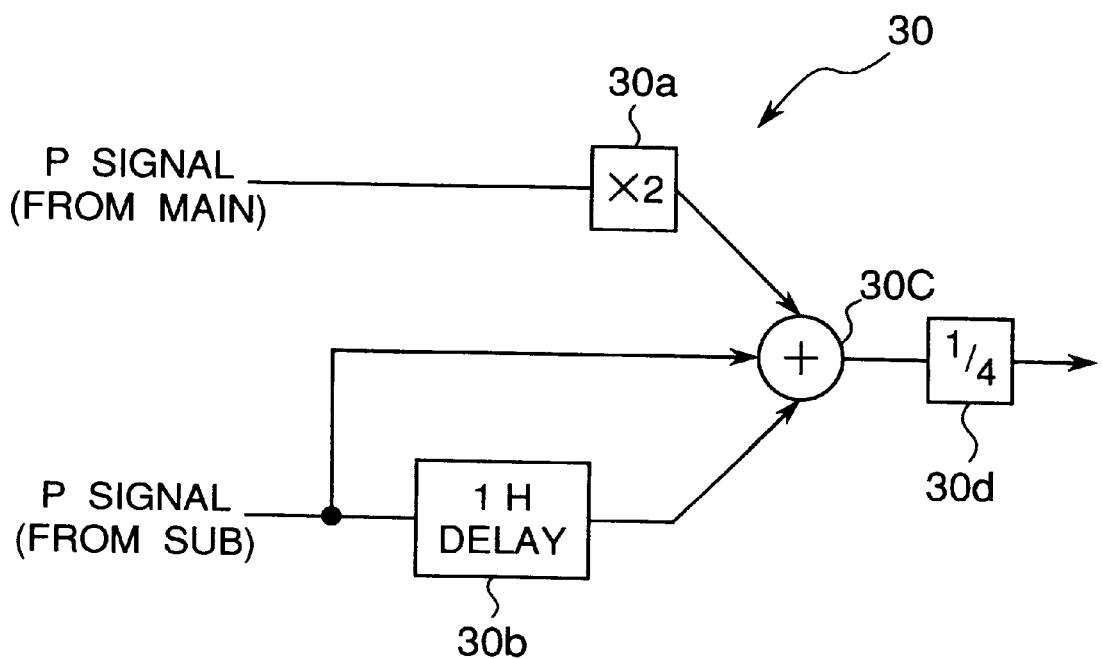
FIG. 5 is a block diagram of the color difference signal bandwidth limiting filter shown in FIG. 4.

Referring to FIG. 4A, a 4:2;2:4 conversion block 30 is shown which limits in bandwidth the color difference signals of the main and sub signals by a vertical filter shown in FIG. 5, and maps only to the main signal. The vertical filter shown in FIG. 5 occupies only a portion of the conversion block 30. These main and sub signals are then input to a coding block 21 as described in the second embodiment above.

The vertical filter shown in FIG. 5 occupying a portion of conversion block 30, comprises a multiplier 30a for multiplying by 2 the color difference signal from the main signal, a 1 H delay 30b for delaying the color difference signal from the sub signal, an adder 30c for adding the multiplied main signal, 1 H delayed sub signal and the direct sub signal, and a divider 30d for dividing the sum produced from the adder 30c. The output from the vertical filter is used as the color difference signal for the main signal. The vertical filter shown in FIG. 5 operates only with respect to the color difference signal. The luminance signals of the main and sub signals are applied directly from terminals 1 and 2 to the coding block 21, as in the second embodiment. Thus, the outputs 30a and 30b from the conversion block 30 are such that output 30a produces a main channel luminance signal and a main channel color difference signal as produced from the vertical filter (FIG. 4E), and output 30b produces a sub channel luminance signal (FIG. 4F).

Figure 6:
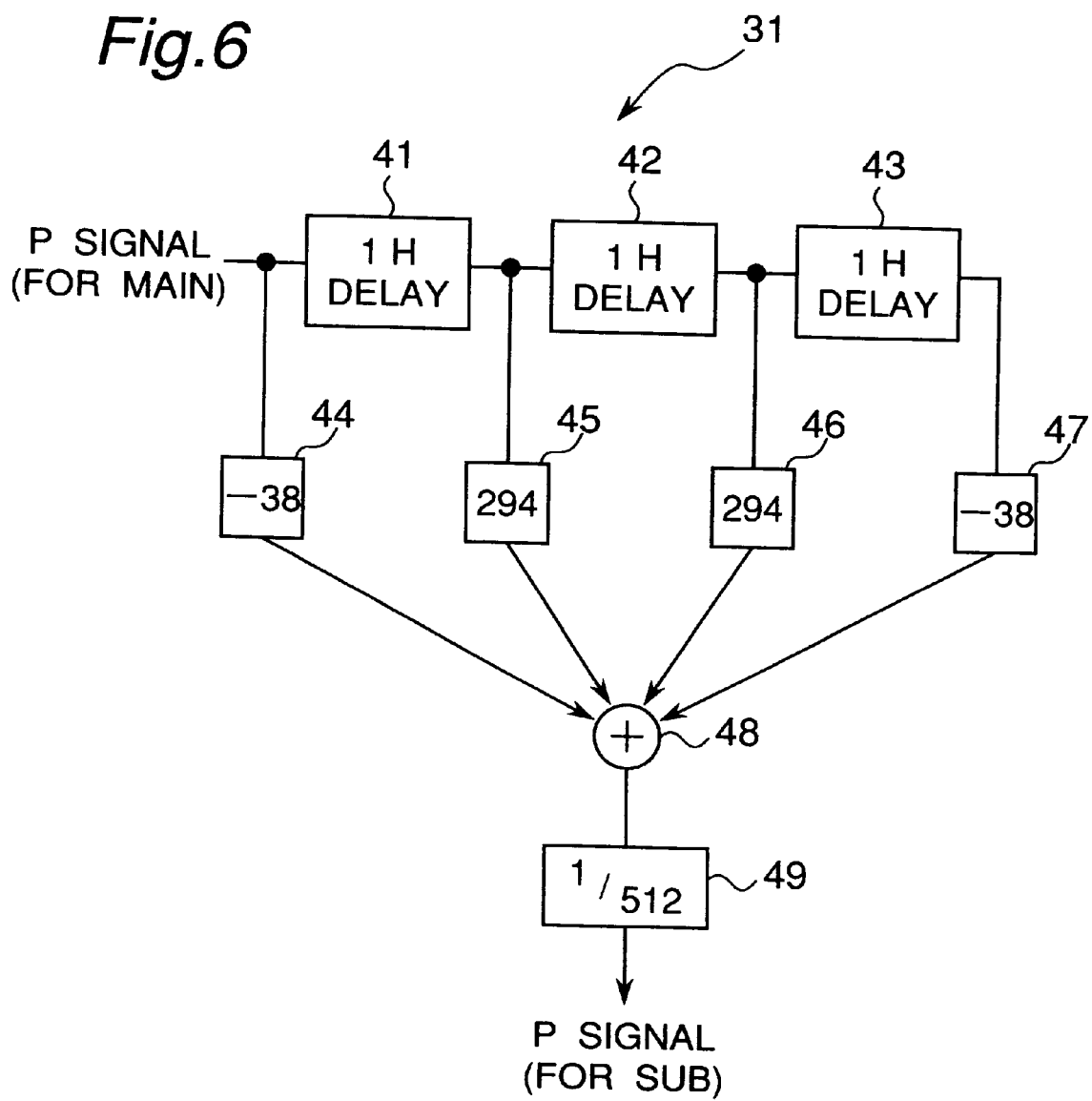
FIG. 6 is a block diagram of the color difference signal interpolation filter shown in FIG. 4.

A color difference signal interpolation block 31 on the reproduction side interpolates the color difference signal of the main signal decoded by the decoding block 24 to generate the color difference signal for the sub signal. A detail of the color difference signal interpolation filter is shown in FIG. 6 as one example of the color difference signal interpolation block 31. As shown in FIG. 6, the filter comprises 1 H line delay lines 41, 42 and 43 with four taps, multipliers 44, 45, 46 and 47, an adder 48, and a coefficient unit 49.

Multipliers 44 and 45 multiply the input to and output from the first 1 H line delay line 41 by the coefficients −38 and 294, respectively; multipliers 46 and 47 multiply the input to and output from the last 1 H line delay line 43 by the coefficients 294 and −38, respectively. The outputs from the four multipliers 44, 45, 46 and 47 are then added by the adder 48, and applied to the coefficient unit 49. The coefficient unit 49 multiplies the added result by 1/512, and outputs the result (FIG. 4M) as the color difference signal of the color difference interpolation-processed sub signal.

The color difference signal (FIG. 4K) of the main signal decoded by the decoding block 24 and delayed by a suitable delay 35, and the color difference signal (FIG. 4M) of the sub signal output by the color difference signal interpolation block 31 are input to a color difference signal selector 32.

The color difference signal selector 32, which is similar to the selection block 25, receives the following inputs: the main signal color difference signal output by the decoding block; the sub signal color difference signal interpolated by the color difference signal interpolation block 31; the first field information from field detector 23; and a second field information from control signal generator 14. The color difference signal selector 32 compares the first and second field information. If the compared first and second field information match, the main signal color difference signal and the sub signal color difference signal are output directly as shown by real lines. If the compared field information are different, the main signal color difference signal and the interpolated sub signal color difference signal are interchanged and output, as shown by dotted lines.

While the main and sub color difference signals are prepared in the above described manner by the selector 32, the main and sub luminance signals are prepared in selector 25 in the same manner as described above in the second embodiment.

A Y/C multiplexer 33 multiplexes the color difference signal output by the color difference signal selector 32 with the luminance signal output by the selector 25.

The operation of a digital image data processing apparatus of FIG. 4A is described below.

The main signal of the digital image data input from the main signal input terminal 1, and the sub signal of the digital image data input from the sub signal input terminal 2, are input to the 4:2:2:4 conversion block 30, which multiplexes the color difference signal of the main signal with the color difference signals of the sub signals on the lines before and after at a 2:1:1 ratio, and remaps the multiplexed signal as the new color difference signal of the main signal. The sub signal is also output as a 4:0:0 interlaced signal containing only the luminance signal and no color difference signal component.

The main signal (FIG. 4E) and sub signal (FIG. 4F) generated by the 4:2:2:4 conversion block 30 are input to the coding block 21, which compresses the interlaced main and sub signals of the two channel digital image data to ½ or smaller size by a high efficiency coding algorithm as in the second embodiment above, and produces a signal channel data (FIG. 4G). The digital image data (FIG. 4G) compressed by the coding block 21 is added with the field information of the input main signal in the field information adder block 22, which then produces the multiplexed signal (FIG. 4H) of the compressed digital image data and the input field information. The multiplexed stream of field information and digital image data is then input to the recording block 5 for modulation or other processing before recording to the magnetic tape 6.

Signal processing on the reproduction side of this digital image data processing apparatus under the normal reproducing mode is described next.

The digital image data (FIG. 4I) reproduced from the magnetic tape 6 by the reproduction block 7 is supplied to the decoding block 24, which decodes the compressed digital image data to the 4:2:2 main signal (FIGS. 4J and 4K) containing bandwidth-limited color difference signals, and the 4:0:0 sub signal (FIG. 4L). The digital image data reproduced by the reproduction block 7 is also input to the field detection block 23 for producing the first field information (FIG. 4N). The color difference signal (FIG. 4K) of the main signal produced from output 24c of the decoding block 24 is input to the color difference signal interpolation block 31 for color difference interpolation.

As described above in connection with FIG. 6, the color difference signal interpolation block 31 produces the color difference signal (FIG. 4M) of the sub signal. The selector 32 receives the color difference signal (FIG. 4M) of the sub signal and the color difference signal (FIG. 4K) of the main signal from delay circuit 35. Under the normal reproducing mode, the first and second field information match. Thus, the connection shown by the real lines in selection block 32 is established. Similarly, the connection shown by the real lines in selection block 25 is established. Thus, the luminance signals (FIG. 4J and 4L) produced from outputs 24a and 24b of decoder 24 are directly produced from outputs 25a and 25b of selector 25. Also, color difference signals (FIG. 4K and 4M) are directly produced from outputs 32a and 32b of selector 32.

The color difference signals of the main and sub signal channels output from the color difference signal selector 32, and the luminance signals of the main and sub signal channels output from the selector 25, are multiplexed by the Y/C multiplexer 33, and output from the output terminals 10 and 11 as the 4:2:2:4:2:2 main and sub signals.

Next, under the still picture reproducing mode is described with reference to FIGS. 4Q to 4Y, in which the graphs shown in FIG. 4Q are the same as those shown in FIGS. 4B to 4H.

The digital image data (FIG. 4R) reproduced from the magnetic tape 6 by the reproduction block 7.

One field data of the compressed and concatenated digital image data output by the reproduction block 7 is repeatedly reproduced; for example, signal of 2Nth field is repeated reproduced (FIG. 4R) Thus, the output 24a of decoder 24 produces the same main video signal repeatedly (FIG. 4S), and the output 24b produces the same sub video signal repeatedly (FIG. 4U). Also the output 24c of decoder 24 produces the same the main color difference signal repeatedly (FIG. 4T), the interpolation block 31 produces the same sub color difference signal repeatedly (FIG. 4V). Furthermore, the field detector 23 produces the first field information which is maintained either HIGH or LOW level. In the above exemplification, even field is repeated so that the HIGH level signal is produced continuously (FIG. 4W) as the first field information. The second field information is 50% duty ratio pulses changing between HIGH and LOW level signals. Thus, in both selectors 25 and 32, the real line connection is made during the 2Nth field periods and the dotted line connection is made during the (2N+1)th field periods. Thus, the main and sub luminance signals applied to selector 25 are exchanged after every other field, and the main and sub color difference signals applied to selector 32 are exchanged after every other field (FIGS. 4X and 4Y). This prevents vertical jitter, i.e., the appearance of the image wiggling vertically during the still picture reproduction mode. A similar operation is done during a fast reproduction mode or during a slow reproduction mode.

It is to be noted that the method of either the first or second embodiment above may be used for the luminance signal.

A delay is also introduced by the color difference interpolation process, but it will be obvious that this delay may be compensated for by either the decoding block 24 or the Y/C multiplexer 33.

Thus, if, for example, the digital image data reproducing field 2 is reproduced when field 1 should be output, the color difference signal is mapped to the main signal of field 2. Because the main signal of field 2 contains the odd-numbered lines, the color difference signal interpolation block 31 generates the color difference signal of the even-numbered lines. When these color difference signals are output to field 1, the color difference signal selector 32 interchanges and outputs the color difference signals of the main and sub channels, thus preventing vertical jitter.

An 8:4:4 progressive component signal is thus converted to generate a 4:2:2:4:2:2 two channel (main and sub signal channels) digital image data stream of which the color difference signal bandwidth is vertically limited to produce a 4:2:2:4 signal. This 4:2:2:4 signal is coded, and the field information transmission block multiplexes the current field during coding to the coded digital image data. During decoding, it is therefore possible to detect the multiplexed field information, and generate the color difference signal for the sub channel by an interpolation filter from the decoded digital image data on the main channel. When the output field and the decoded digital image data field do not match, the color difference signal selector interchanges the decoded color difference signal and the interpolated color difference signal, and it is therefore possible to obtain vertical jitter-free digital image data even when the coded signal is a 4:2:2:4 signal.

Figure 7:
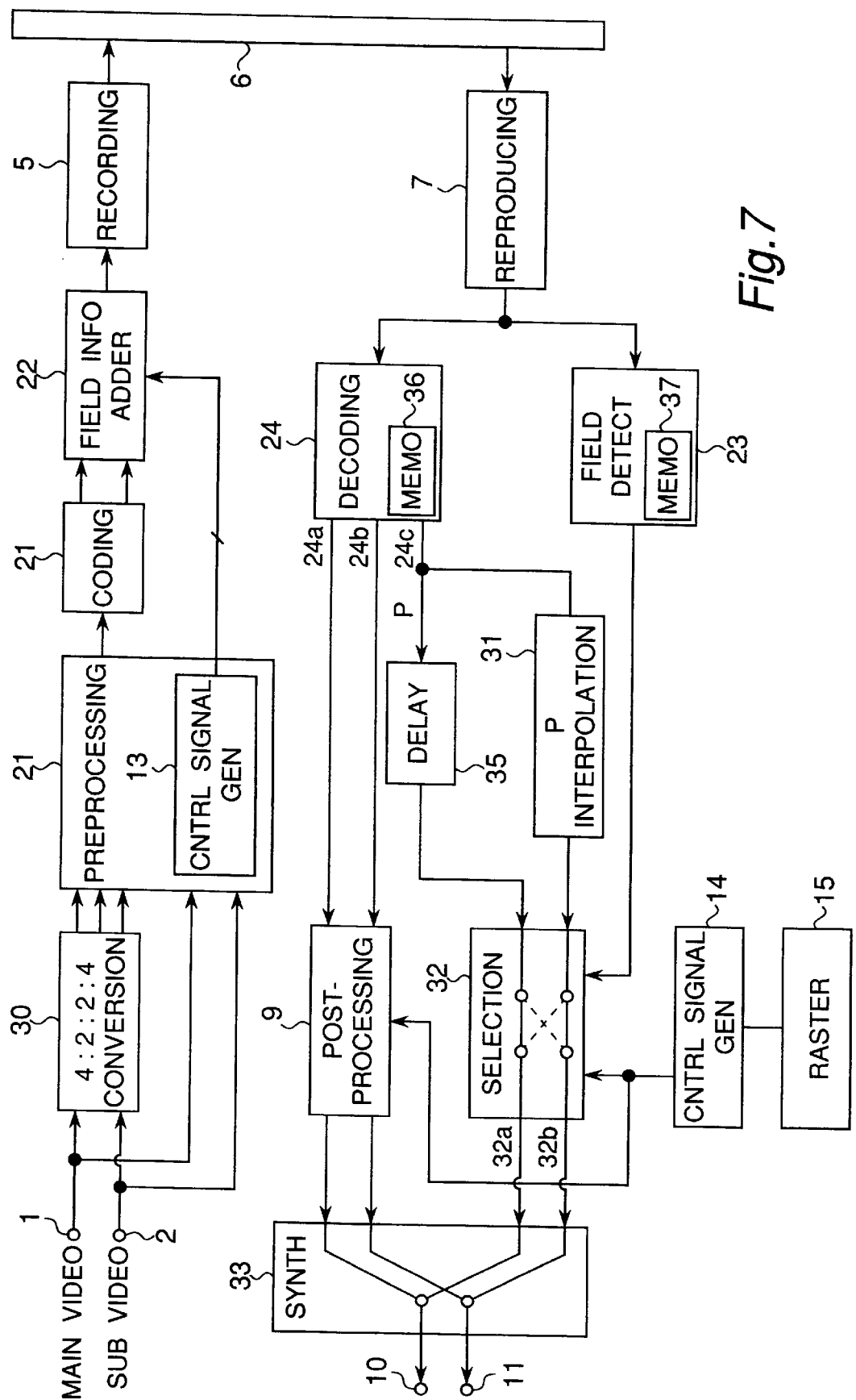
FIG. 7 is a block diagram of a digital image data processing apparatus according to the fourth embodiment of the present invention.
Figure 8A:
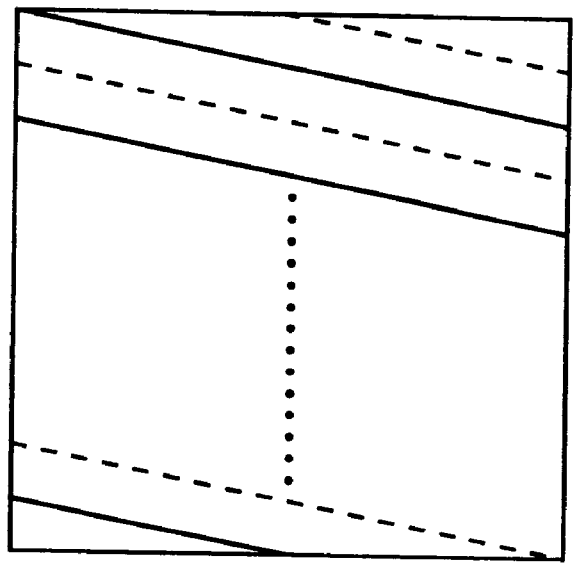
FIGS. 8A and 8B are diagrams showing the main signal and sub signal relationship.
Figure 8B:
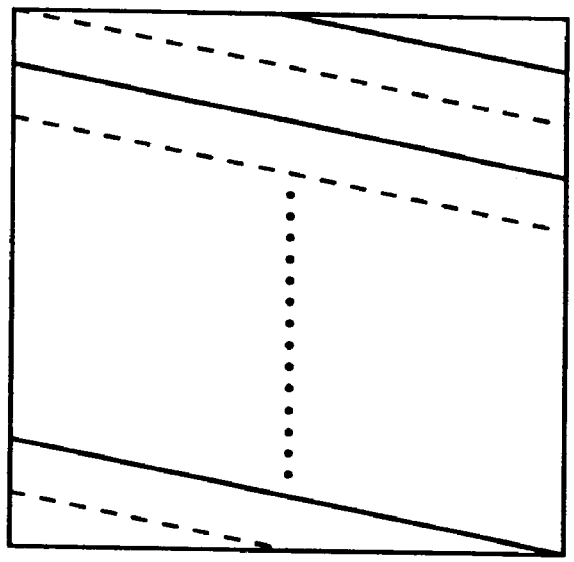

FIG. 7 shows a modification of the third embodiment in which, instead of coding block 21, preprocessing block 3 and coding block 4 are inserted; and instead of selection block 25, post-processing block 9 are inserted.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A digital image data processing apparatus having an input processing apparatus for processing the digital image data before recording and an output processing apparatus for processing the digital image data after recording, said digital image data processing apparatus comprising:

said input processing apparatus comprising:

first and second input terminals for receiving first and second channel signals, said first channel signal carrying even number line signals during 2Nth field period, and odd number line signals during (2N+1)th field period, and said second channel signal carrying odd number line signals during 2Nth field period, and even number line signals during (2N+1)th field period;

conversion means for separating said first channel signal to first luminance signal and first color difference signal, and said second channel signal to second luminance signal and second color difference signal, and combining said first and second color difference signals to a combined color difference signal;

coding means for coding and compressing said first and second luminance signals and said combined color difference signal in each field period, and concatenating the compressed first and second luminance signals and said combined color difference signal to a single channel digital image data stream of one field period; and field information adding means for adding a first field information to said single channel digital image data stream indicative of odd or even field period.

2. A digital image data processing apparatus according to claim 1, further comprising:

said output processing apparatus comprising:

decoding means for decoding and expanding said single channel digital image data stream to restore said first and second luminance signals and said combined color difference signal in each field period;

field information detection means for detecting said first field information in said single channel digital image data stream;

field information generation means for generating a second field information intrinsic to said output processing apparatus;

generation means for generating a quasi first color difference signal and a quasi second color difference signal from said combined color difference signal;

first selection means for selecting said first and second luminance signals as first and second output luminance signals when said detected first field information matches said second field information, and for selecting said first and second luminance signals as second and first output luminance signals when said detected first field information differs from said second field information; and second selection means for selecting said first and second quasi color difference signals as first and second output color difference signals when said detected first field information matches said second field information, and for selecting said first and second quasi color difference signals as second and first output color difference signals when said detected first field information differs from said second field information.

3. A digital image data processing apparatus according to claim 2, wherein said output processing apparatus further comprises multiplexing means for multiplexing said first output luminance signal and said first output color difference signal, and multiplexing said second output luminance signal and said second output color difference signal.

4. A digital image data processing apparatus having an input processing apparatus for processing the digital image data before recording and an output processing apparatus for processing the digital image data after recording, said digital image data processing apparatus comprising:

said output processing apparatus comprising:

decoding means for decoding and expanding a single channel digital image data stream to first and second luminance signals and a combined color difference signal in each field period, said combined color difference signal being formed by first and second color difference signals, said first luminance signal and said first color difference signal being formed by a first channel signal, and said second luminance signal and said second color difference signal being formed by a second channel signal, said first channel signal carrying even number line signals during 2Nth field period, and odd number line signals during (2N+1) th field period, and said second channel signal carrying odd number line signals during 2Nth field period, and even number line signals during (2N+1)th field period:

field information detection means for detecting a first field information in said single channel digital image data stream, said first field information indicative of odd or even field period of said first and second channel signal;

field information generation means for generating a second field information intrinsic to said output processing apparatus;

generation means for generating a quasi first color difference signal and a quasi second color difference signal from said combined color difference signal;

first selection means for selecting said first and second luminance signals as first and second output luminance signals when said detected first field information matches said second field information, and for selecting said first and second luminance signals as second and first output luminance signals when said detected first field information differs from said second field information; and second selection means for selecting said first and second quasi color difference signals as first and second output color difference signals when said detected first field information matches said second field information, and for selecting said first and second quasi color difference signals as second and first output color difference signals when said detected first field information differs from said second field information.

5. A digital image data processing apparatus according to claim 4, wherein said output processing apparatus further comprises multiplexing means for multiplexing said first output luminance signal and said first output color difference signal, and multiplexing said second output luminance signal and said second output color difference signal.

6. A digital image data processing method having an input processing step for processing the digital image data before recording and an output processing step for processing the digital image data after recording, said digital image data processing method comprising the step of:

said input processing step comprising the sub-steps of:
receiving first and second channel signals, said first channel signal carrying even number line signals during 2Nth field period, and odd number line signals during (2N+1) th field period, and said second channel signal carrying odd number line signals during 2Nth field period, and even number line signals during (2N+1)th field period;

separating said first channel signal to first luminance signal and first color difference signal, and said second channel signal to second luminance signal and second color difference signal, and combining said first and second color difference signals to a combined color difference signal;

coding and compressing said first and second luminance signals and said combined color difference signal in each field period, and concatenating the compressed first and second luminance signals and said combined color difference signal to a single channel digital image data stream of one field period; and adding a first field information to said single channel digital image data stream indicative of odd or even field period.

7. A digital image data processing method according to claim 6, further comprising the step of:

said output processing step comprising the sub-steps of:
decoding and expanding said single channel digital image data stream to restore said first and second luminance signals and said combined color difference signal in each field period;

detecting said first field information in said single channel digital image data stream;

generating a second field information intrinsic to said output processing apparatus;

generating a quasi first color difference signal and a quasi second color difference signal from said combined color difference signal;

selecting said first and second luminance signals as first and second output luminance signals when said detected first field information matches said second field information, and for selecting said first and second luminance signals as second and first output luminance signals when said detected first field information differs from said second field information; and selecting said first and second quasi color difference signals as first and second output color difference signals when said detected first field information matches said second field information, and for selecting said first and second quasi color difference signals as second and first output color difference signals when said detected first field information differs from said second field information.

8. A digital image data processing method according to claim 7, wherein said output processing step further comprises the sub-step of multiplexing said first output luminance signal and said first output color difference signal, and multiplexing said second output luminance signal and said second output color difference signal.

9. A digital image data processing method having an input processing step for processing the digital image data before recording and an output processing step for processing the digital image data after recording, said digital image data processing method comprising the step of:

said output processing step comprising the sub-steps of:
decoding and expanding a single channel digital image data stream to first and second luminance signals and a combined color difference signal in each field period, said combined color difference signal being formed by first and second color difference signals, said first luminance signal and said first color difference signal being formed by a first channel signal, and said second luminance signal and said second color difference signal being formed by a second channel signal, said first channel signal carrying even number line signals during 2Nth field period, and odd number line signals during (2N+1) th field period, and said second channel signal carrying odd number line signals during 2Nth field period, and even number line signals during (2N+1) th field period:

detecting a first field information in said single channel digital image data stream, said first field information indicative of odd or even field period of said first and second channel signal;

generating a second field information intrinsic to said output processing apparatus;

generating a quasi first color difference signal and a quasi second color difference signal from said combined color difference signal;

selecting said first and second luminance signals as first and second output luminance signals when said detected first field information matches said second field information, and for selecting said first and second luminance signals as second and first output luminance signals when said detected first field information differs from said second field information; and selecting said first and second quasi color difference signals as first and second output color difference signals when said detected first field information matches said second field information, and for selecting said first and second quasi color difference signals as second and first output color difference signals when said detected first field information differs from said second field information.

10. A digital image data processing method according to claim 9, wherein said output processing step further comprises the sub-step of multiplexing said first output luminance signal and said first output color difference signal, and multiplexing said second output luminance signal and said second output color difference signal.

* * * * *